United States Patent [19]

Bares et al.

[11] Patent Number: 5,027,065
[45] Date of Patent: Jun. 25, 1991

[54] PARTICLE SENSOR PLUG WITH WIRELESS CASING CONNECTION

[76] Inventors: Jean-Paul Y. Bares, 47, Rue De La Vierge, Villiers St Frederic 78640 Neauphie le Chateru; Eric Y. Blanchard, les Lions- Bat A2 7, av. Simon Vouet, 78560 Le Port Marly, France

[21] Appl. No.: 524,491

[22] Filed: May 17, 1990

[30] Foreign Application Priority Data

May 18, 1989 [FR] France ................. 89 06491

[51] Int. Cl.$^5$ ..................... G01N 27/74; G01R 33/12
[52] U.S. Cl. .................................. 324/204; 340/631
[58] Field of Search ............... 324/204, 228; 73/10; 340/631

[56] References Cited

U.S. PATENT DOCUMENTS

| | | | |
|---|---|---|---|
| 2,671,200 | 3/1954 | Lederer | 324/71 |
| 3,404,337 | 10/1968 | Pool et al. | 324/41 |
| 4,339,714 | 7/1982 | Ellis | 324/207.16 |

FOREIGN PATENT DOCUMENTS

| | | |
|---|---|---|
| 2159757 | 6/1973 | France . |
| 2564897 | 11/1985 | France . |
| 1241204 | 8/1971 | United Kingdom . |
| 2190503A | 11/1987 | United Kingdom . |

Primary Examiner—Walter E. Snow
Attorney, Agent, or Firm—Bacon & Thomas

[57] ABSTRACT

A particle sensor having a magnet for attracting and retaining metallic particles in a lubricating fluid is disclosed having a sensor to determine when the particles attracted and retained on the magnet have reached a predetermined level and to transmit this information to a machine operator. The sensor, which includes a plug removably attached to the machine casing, has a magnet which extends into the path of the lubricating fluid to attract and retain metallic particles. A pair of coils, one attached to the moveable plug and one attached to the casing adjacent to the plug are inductively coupled such that the accumulation of particles on the magnet changes the inductance of the coils. An electronic circuit converts the changes in inductance to voltage changes to activate an alarm or other signal to the operator when the threshold value has been reached.

9 Claims, 2 Drawing Sheets

PARTICLE SENSOR PLUG WITH WIRELESS CASING CONNECTION

BACKGROUND OF THE INVENTION

The present invention relates to a sensor for sensing the presence of metallic particles in a lubricating fluid circulating through a machine casing. The sensor includes a permanent magnet extending into the lubricating fluid to attract and retain metal particles carried along by the lubricating fluid.

It is well known in the art to incorporate magnetic plugs in the casings of machines to attract and retain metallic particles in the lubricating fluid of the machine. These devices, a typical example of which is shown in French patent 2,159,757, require frequent inspections to determine when the particles accumulated on the magnet exceed a given threshold amount. Once the particles exceed this threshold amount, the magnet may be completely covered and, therefore, unable to attract and retain any additional particles. This will allow the particles to remain in the lubricating fluid and cause considerable damage to the moving parts of the machine.

SUMMARY OF THE INVENTION

A particle sensor having a magnet for attracting and retaining metallic particles in a lubricating fluid is disclosed having a sensor to determine when the particles attracted and retained on the magnet have reached a predetermined level and to transmit this information to a machine operator. The sensor, which includes a plug removably attached to the machine casing, has a magnet which extends into the path of the lubricating fluid to attract and retain metallic particles. A pair of coils, one attached to the movable plug and one attached to the casing adjacent to the plug, are inductively coupled such that the accumulation of particles on the magnet changes the inductance of the coils. An electronic circuit converts the changes in inductance to voltage changes to activate an alarm or other signal to the operator when the threshold value has been reached.

The use of a pair of inductively coupled coils eliminates the need for any electrical wires interconnecting the sensor plug to the casing which would be subjected to excessive mechanical stresses during the insertion and removal of the plug. Elimination of the electrical connecting wires between the plug and the casing removes a potential source of failure for the particle sensing system.

The ends of the coil attached to the plug are connected to a pair of electrodes located on the magnet so as to define a gap between them. The magnet is exposed to the lubricating coil in the gap between the electrodes such that the metallic particles are collected on the magnet surface in the gap between the electrode. As the particles accumulate, the inductance of the coil on the plug and, consequently, the inductance of the coil attached to the casing are changed. The change in inductance is sensed by an electronic circuit having a control loop including a voltage-controlled oscillator of which the frequency is controlled to match the resonance of an LC circuit which incorporates the coil attached to the casing. The control voltage of the oscillator is also used as an output signal.

The magnet may be a permanent magnet having a generally cylindrical shape wherein the two electrodes are located so as to define a narrow annular gap extending around the periphery of the permanent magnet.

Good inductive coupling between the two coils is facilitated by mounting them on yokes made of a material having a high magnetic permeability and locating them closely adjacent to each other.

DETAILED DESCRIPTION OF THE PREFERRED EMBODIMENT

Figure 1:
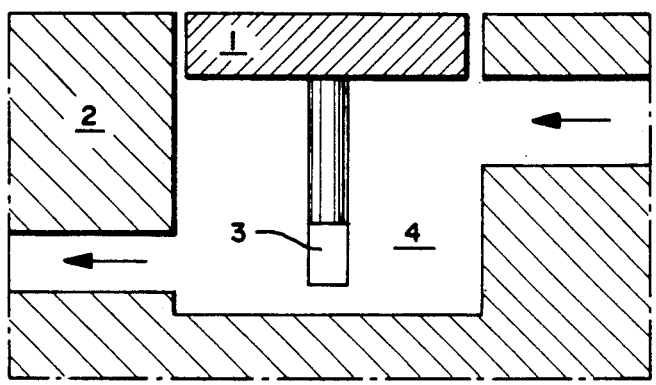
FIG. 1 is a schematic illustration of a known type of magnetic plug.

A schematic illustration of the a type of magnetic plug is illustrated in FIG. 1 and comprises a magnetic plug 1 attached to a machine casing 2 defining a lubrication circuit 4 to circulate a lubricating fluid, such as oil, over the moving parts of the machine. As the moving parts wear, minute particles of metal are entrained in the lubricating fluid passing through lubrication circuit 4. The plug 1 has a permanent magnet 3 immersed in the lubricating fluid flow to attract and retain the metallic particles in the lubricating fluid. This prevents the circulation of the metallic particles which could cause severe damage to the moving parts of the machine.

It is necessary to inspect the permanent magnet 3 by removing the plug 1 from the machine casing 2 in order to determine the quantity of particles that have been attracted to the magnet. If the quantity of particles has completely covered the magnet's surface, the magnet will have a reduced effectiveness and increase the probability that metallic particles remain in the lubricating fluid.

It is an object of the present invention to provide a particle sensor that generates an output signal when the quantity of metallic particles retained on the magnet has reached a predetermined level. The output signal may activate a display or an alarm to indicate to the machine operator that the magnet has reached this level and should be visually inspected. By utilizing the system according to the invention, it is not necessary to remove the plug until the magnet has accumulated the predetermined amount of particles.

Figure 2:
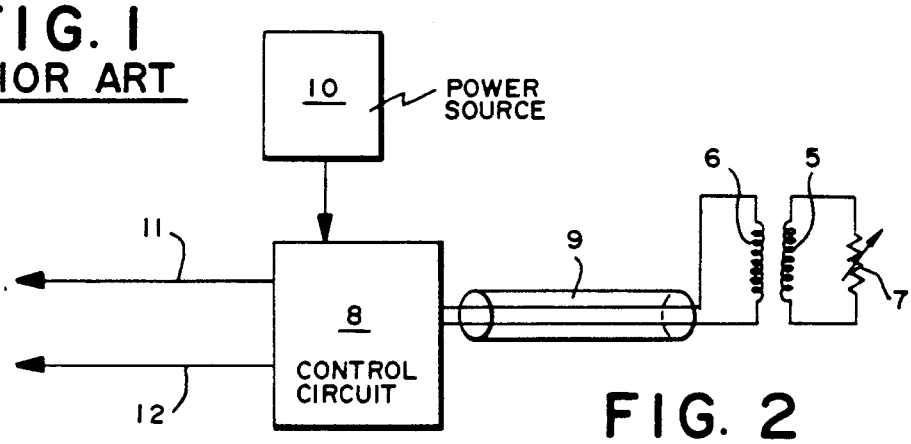
FIG. 2 is a schematic diagram of the sensor according to the present invention.

It is also an object of the present invention to generate this signal by a circuit that has no physical electrical connection between the plug and the casing. This is accomplished by use of the inductive couplings as schematically illustrated in FIG. 2. A first coil 5 is attached to the removable plug and is inductively coupled with a second coil 6 that is mounted on the stationary part of the machine casing adjacent to the first coil 5. The plug coil 5 has ends attached to a variable resistor 7 such that, when the circuit is opened and the resistance 7 is infinite, the inductance seen from coil 6 is the inductance of that coil. When the resistance 7 is reduced, such as when the circuit is closed, the inductance as seen in coil 6 equals the inductance of this coil less the mutual inductance of coils 5 and 6. Thus, the change in inductance seen from coil 6 results from the changes in the value of resistor 7.

The changes in inductance in the second coil 6 are evaluated by an electronic control circuit 8 to which the coil 6 is connected by cable 9. Cable 9 may either be coaxial or parallel conductor cable. The electronic control circuit 8, which will be described in greater detail with regard to FIG. 4, comprises a control loop transducing inductance into voltage. Power is supplied from a regulated power source 10 and the control circuit 8 may have an output 11 operatively associated with a visual display or an alarm and a secondary output 12 which acts as a malfunction alarm for the circuit.

Figure 3:
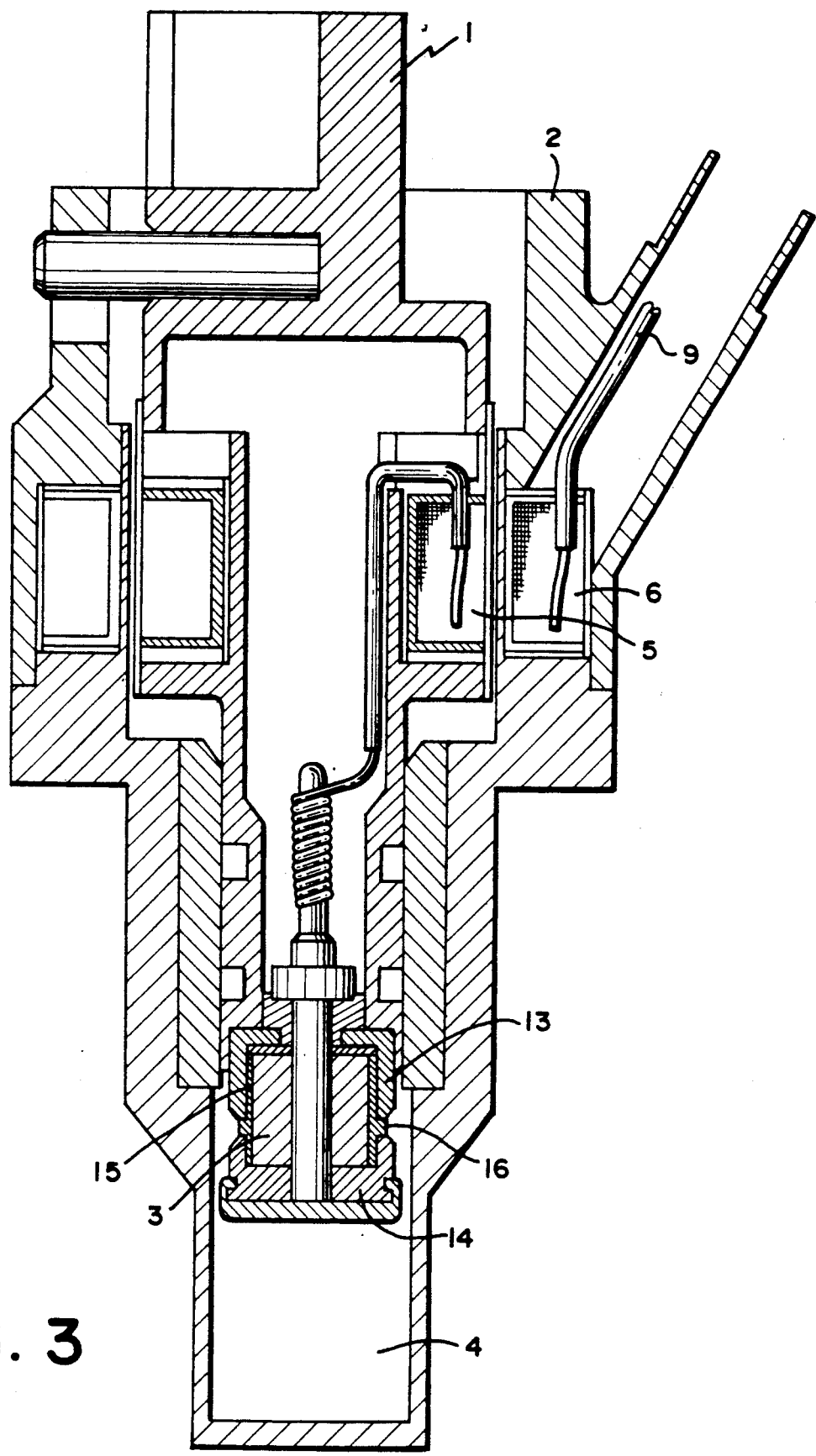
FIG. 3 is a cross-sectional view of the particle sensor according to the present invention.

The particle sensor according to the present invention is shown in detail in FIG. 3 wherein it is seen that removable plug 1 is removably attached to machine casing 2 such that permanent magnet 3 extends into the lubricating fluid flow passage 4. The first coil 5 is attached to the removable plug 1, while second coil 6 is attached to the machine casing 2 and is located closely adjacent to the first coil 5 when the plug 1 is inserted into the machine case 2.

A pair of electrodes 13 and 14 are located on the permanent magnet 3 and are operatively associated with the first coil 5 such that one end of the coil is electrically connected to electrode 13 and the opposite end of the coil 5 is electrically connected to electrode 14. To prevent shorting of the electrodes 13 and 14, an insulating sleeve 15 electrically insulates the electrode 13 from the permanent magnet 3.

The electrodes 13 and 14 each have an edge portion located so as to define an annular gap 16 between them through which the permanent magnet 3 is exposed to the lubricating fluid. It is in this gap 16 that the metallic particles in the lubricating fluid will be attracted to and retained by the magnet 3. As the metallic particles fill the gap 16, the electrical resistance between electrodes 13 and 14 will drop considerably, thereby changing the inductance of the coil 6, through coil 5, which will be detected by the electronic control circuit 8 as described above. In this particular instance, the resistance between the electrodes 13 and 14 is analogous to the variable resistance 7 schematically illustrated in FIG. 2.

The shape of the annular gap 16 separating the electrodes 13 and 14 so designed is that the particles accumulate at that location. The edges of the electrodes 13 and 14 may be chamfered as illustrated in FIG. 3 to facilitate the accumulation of the particles in the annular gap.

First and second coils 5 and 6 are wound on yokes which must conduct the induction flow and, therefore, must consist of a material having a high magnetic permeability (such as mu-metal). It is also necessary that the yoke of coil 6 located in the machine casing 2 be made of a material that does not effect the induction of the coil. It has been found that polytetrafluroethylene is satisfactory for this purpose.

Figure 4:
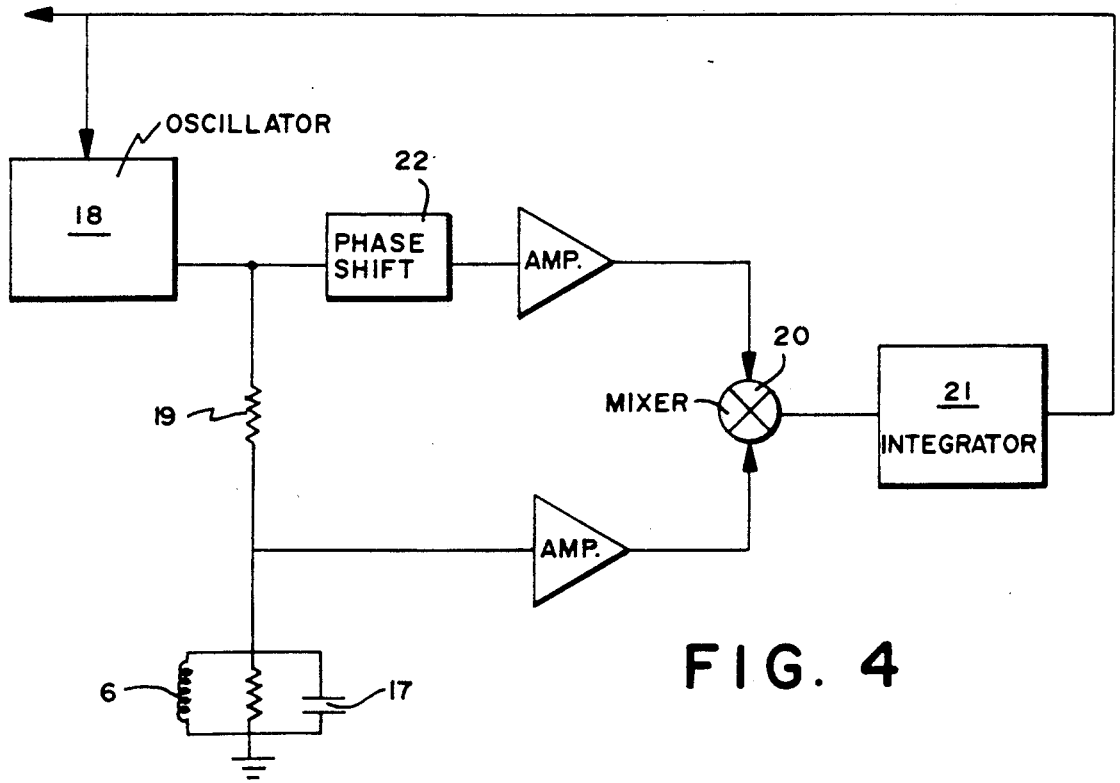
FIG. 4 is a schematic diagram of the electrical circuit used with the particle sensor according to this invention.

As schematically illustrated in FIG. 4, the coil 6 having an inductance L is associated with a capacitor 17 having a capacitance C forming an LC circuit. The purpose of the feedback suggested herein is to keep the frequency of oscillator 18 such that the LC circuit shall remain tuned in spite of the changes in the inductance L. Accordingly, for any change in inductance, the output frequency of the voltage control oscillator 18 varies as follows:

$$\omega_o^2 = \frac{1}{LC}, \quad \omega_o = 2\pi f_o$$

In steady state, the control is stable and, therefore, the voltages on either side of the resistor 19, connected between the outputs of the oscillator 18 and LC circuit, are in phase. A mixer 20 is connected to the terminals of the resistor 19, which connection includes a phase shifter 22 between it and the oscillator 18. The phase shifter 22 may shift the phase of the oscillator output $\pi/2$. Thus, the output signal from mixer 20 takes the form of:

$$\cos(\omega_o t)\cos(\omega_o t + \pi/2) = \tfrac{1}{2}\cos(2\omega_o t).$$

This signal, lacking a DC component, will not, after having passed through integrator 21, effect the control value of the oscillator 18. When the inductance changes, the relationship $$\omega_o^2 = \frac{1}{LC}$$

no longer holds true, and signals at the ports of oscillator 18 are no longer in phase. By using the phase shift D the output signal from the mixer 20 becomes:

$$\cos(\omega t + \pi/2)\cos(\omega_o T + D) = \tfrac{1}{2}[\cos(2\omega_o t + \pi/2 + D) + \sin(D)]$$

Following integration by the integrator 21, only the phase shift is considered and the frequency is modified until the phase shift D is minimized. Accordingly, the control voltage for the oscillator 18 represents the inductance L and may be used to sense inductance variations and, hence, metal particle accumulations on the plug 1.

The particle sensor according to the present invention is not only able to detect the accumulation of particles on the magnet, but is also able to detect malfunctions in the sensor itself. The most common malfunctions are shorts occurring in the coils or open circuits due to a break in the electric circuitry. As regards to the stationary coil 6, both types of malfunctions can be sensed by the change in the frequency of oscillator 18. In regards to the first coil 5 on the removable plug I, the user can detect a short if, after having cleaned and replaced the plug 1 in the casing, the alarm is still indicated. An open circuit in the coil 5 can be detected by adding a resistor attached to the terminals of the coil 5 in parallel with the electrodes 13 and 14.

Although the particle sensor according to the present invention may be used in all types of machinery in which it is important to detect the abnormal wear of the machine components, it has found particular usage in aircraft gas turbine engines. The use of several particle sensors in each of the various oil circuits of the gas turbine prevents serious engine malfunctions and enables the rapid location of any of the parts being abnormally worn.

The foregoing description is provided for illustrative purposes only and should not be construed as any way limiting this invention, the scope of which is defined solely by the appended claims.

We claim:

1. A particle sensor for sensing the presence of metallic particles in a lubricating fluid circulating through a machine casing comprising:
   (a) a plug removably attached to the machine casing;
   (b) a magnet attached to the plug and located so as to extend into the lubricating fluid such that metallic particles in the lubricating fluid are attracted to the magnet;

(c) a first coil located on and electrically insulated from the plug;

(d) a second coil located on the casing adjacent to the first coil so as to be inductively coupled therewith;

(e) variable resistance means located on the plug and electrically connected to the first coil such that an accumulation of metallic particles on the magnet changes the resistance of the variable resistance means thereby changing the inductance of the first and, consequently, the second coils as metallic particles build up on the magnet; and, (f) electrical circuit means connected to the second coil to sense the varrying inductance of the second coil and generate an output signal.

2. The particle sensor according to claim 1 further comprising alarm means operatively associated with the electrical circuit means such that the output signal activates the alarm means when the particle build-up reaches a predetermined level.

3. The particle sensor according to claim 1 wherein the magnet comprises a permanent magnet.

4. The particle sensor according to claim 3 wherein the variable resistance means electrically connected to the first coil comprises:

(a) a first electrode located on the magnet and electrically connected to a first ned of the first coil; and, (b) a second electrode located on the magnet and electrically connected to a second end of the first coil, the second electrode located with respect to the first electrode so as to define a gap therebetween.

5. The particle sensor according to claim 4 wherein the first and second electrodes are located such that the gap extends around the periphery of the magnet.

6. The particle sensor according to claim 5 wherein the first and second electrodes each comprise a chamfered edge portion defining opposite sides of the gap.

7. The particle sensor according to claim 1 further comprising first and second yokes made of material having high magnetic permeability on which the first and second coils are wound, respectively.

8. The particle sensor according to claim 1 wherein the electrical circuit means comprises:

(a) an LC circuit including the second coil;

(b) an oscillator;

(c) a mixer electrically connected to the LC circuit and the oscillator;

(d) a phase shifter operatively interposed between the oscillator and the mixer;

(e) an integrator operatively connected to the mixer.

9. The particle sensor according to claim 8 wherein the phase shifter is a $\pi/2$ phase shifter.

* * * * *